US010765210B2

(12) United States Patent
Laplace et al.

(10) Patent No.: US 10,765,210 B2
(45) Date of Patent: Sep. 8, 2020

(54) MOUNTING DEVICE AND CARTON FLOW BED

(71) Applicant: Interroll Holding AG, Sant' Antonino (CH)

(72) Inventors: Jean Michel Laplace, La Roche sur Yon (FR); Herve Merieau, Les Lucs sur Boulogne (FR)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 15/805,170

(22) Filed: Nov. 7, 2017

(65) Prior Publication Data
US 2018/0125237 A1    May 10, 2018

(30) Foreign Application Priority Data

Nov. 9, 2016  (EP) ..................... 16290215

(51) Int. Cl.
*A47B 96/06* (2006.01)
*B65G 1/02* (2006.01)
(Continued)

(52) U.S. Cl.
CPC ............ *A47B 96/06* (2013.01); *A47F 1/12* (2013.01); *A47F 5/10* (2013.01); *B65G 1/02* (2013.01);
(Continued)

(58) Field of Classification Search
CPC ....... A47B 96/06; A47B 57/045; A47B 57/04; A47B 2230/0007; A47B 2230/0014;
(Continued)

(56) References Cited

U.S. PATENT DOCUMENTS 1,687,976 A * 10/1928 Ford ..................... E04G 13/025
                                                      248/357
2,345,650 A *  4/1944 Attwood .............. B62D 33/044
                                                      211/182
(Continued)

FOREIGN PATENT DOCUMENTS

AU          11495/83        8/1984
AU         2014 277 825     7/2015
(Continued)

OTHER PUBLICATIONS

European Search Report dated Jul. 6, 2017.
Chinese Office Action dated Apr. 3, 2019.

*Primary Examiner* — Ko H Chan
(74) *Attorney, Agent, or Firm* — Gerald E. Hespos; Michael J. Porco; Matthew T. Hespos

(57) ABSTRACT

A mounting device (100) is provided for connecting two substantially horizontally aligned support beams (20, 30, 40) of a carton flow bed rack (1; 2). The mounting device (100) has a plug (110) pluggable into an end of a first support beam (20) of the support beams. A key (130) is provided as a wedge for fixing the plug (110) in the first support beam (20). An engaging element (120) is arranged at the plug (110). The engaging element (120) is provided to engage a second support beam (30; 40) of the two support beams. The plug (110) is fixable to the first support beam (20) in at least two different plug-positions by means of the key (130).

11 Claims, 6 Drawing Sheets

(51) Int. Cl.
  *B65G 1/08* (2006.01)
  *A47F 1/12* (2006.01)
  *A47F 5/10* (2006.01)
  *F16B 7/04* (2006.01)

(52) U.S. Cl.
  CPC .............. *B65G 1/023* (2013.01); *B65G 1/08* (2013.01); *F16B 7/0446* (2013.01)

(58) Field of Classification Search
  CPC .......... A47B 96/1441; A47F 5/10; A47F 1/12; A47F 1/04; A47F 5/0043; B65G 1/08; B65G 1/023; B65G 1/02; F16B 7/0446; F16B 12/50; F16B 12/28
  USPC ........................................................ 211/59.2
  See application file for complete search history.

(56) References Cited

U.S. PATENT DOCUMENTS

| | | | | |
|---|---|---|---|---|
| 3,513,606 A | * | 5/1970 | Jones | A47B 47/0016 211/182 |
| 4,140,414 A | | 2/1979 | Buttgereit | |
| 4,154,419 A | * | 5/1979 | Breidenbach | A47B 57/402 108/110 |
| 4,493,578 A | * | 1/1985 | D'Alessio | E04G 7/307 182/186.8 |
| 5,115,920 A | * | 5/1992 | Tipton | B65G 1/023 211/151 |
| 5,295,591 A | * | 3/1994 | Slater | A47B 47/027 211/151 |
| 5,802,891 A | * | 9/1998 | Kahara | E05B 65/462 312/333 |
| 6,196,401 B1 | * | 3/2001 | Brady | A47F 1/121 211/186 |
| 6,767,154 B1 | * | 7/2004 | Schwoerer | E04G 17/045 249/191 |
| 7,217,058 B2 | * | 5/2007 | Herb | E04B 9/127 403/230 |
| 8,205,854 B2 | * | 6/2012 | Brewka | E04G 17/045 249/196 |
| 8,919,580 B2 | * | 12/2014 | Johnson | A47F 1/12 211/59.2 |
| 8,992,114 B2 | * | 3/2015 | Ajanovic | F16B 12/2063 403/362 |
| 9,681,584 B2 | * | 6/2017 | Wong | H05K 7/1404 |
| 2003/0230467 A1 | | 12/2003 | Diego | |
| 2005/0115809 A1 | | 6/2005 | Lutz | |
| 2006/0108306 A1 | | 5/2006 | Minchey | |
| 2008/0110127 A1 | | 5/2008 | Terada et al. | |

FOREIGN PATENT DOCUMENTS

| | | |
|---|---|---|
| CA | 2 773 358 | 3/2010 |
| CN | 203 958 316 | 11/2014 |
| DE | 200 11 696 | 1/2001 |
| EP | 1 580 344 | 9/2005 |
| GB | 837644 | 6/1960 |
| GB | 1 204 030 | 9/1970 |
| JP | S51-119116 | 9/1976 |
| JP | 10-131923 | 5/1998 |
| JP | 3625553 | 3/2006 |
| WO | 02/051726 | 7/2002 |

* cited by examiner

MOUNTING DEVICE AND CARTON FLOW BED

BACKGROUND

Field of the Invention

The invention relates to a mounting device and method for connecting two support beams of a rack, in particular of a carton flow bed rack.

Description of the Related Art

Carton flow bed racks are used to store and/or distribute loads, in particular parcels, cartons, and/or other goods. Carton flow bed racks are characterized in that they comprise a load side from which the rack is loaded and an unload side from which the rack is unloaded. There are carton flow bed racks that are loaded and unloaded at the same side, and others that are loaded and unloaded at different, e.g. opposite, sides. Carton flow bed racks may comprise wheel tracks to transport loads from one side of the rack to the other side.

For enabling a stable support, e.g. of these wheel tracks and the loads, support beams are provided. In particular at edges of the rack, two support beams are connected to each other substantially perpendicular to each other. This connection of the support beams is vital for the carton flow bed rack, because it has to provide a substantial stability to resist heavy usage when loading and unloading loads onto and from the carton flow bed rack. Therefore, said connection of the support beams should provide sufficient strength and durability.

Furthermore, since each rack comprises a plurality of said edge-connections, it is advantageous if these connections may be established simply and quickly.

The problem relates to providing an improved connection for two support beams of a rack, in particular of a carton flow bed rack that requires increased stability.

SUMMARY

One aspect relates to a mounting device for connecting two support beams of a rack, in particular of a carton flow bed rack, comprising a plug pluggable into an end of a first support beam of the two support beams and an engaging element arranged at the plug, wherein the engaging element is provided to engage a second support beam of the two support beams. Therein, the plug is fixable to the first support beam in at least two different plug-positions.

The mounting device is used to establish a connection between the two support beams. In particular, the mounting device enables establishing a firm and/or stable connection of the two support beams in a substantially perpendicular manner. Preferably, the support beams are provided as substantially horizontally aligned support beams, namely side beams, end beams, front beams, back beams, and/or intermediate beams that support substantially horizontally aligned elements of the rack, in particular elements like shelves, trays, wheel tracks, and/or loads. In particular, the support beams may be provided as load beam and/or unload beam of a carton flow bed rack.

The mounting device is especially suitable to connect two support beams of a carton flow bed rack, since the mounting device provides a substantial durability, strength, and stability. Furthermore, the mounting device enables a simple and fast installation.

The mounting device may comprise a plurality of elements. The plug is provided as one element of the mounting device. The plug is provided so that it is pluggable into the end of the first support beam. In case the first support beam is provided with a hollow profile, the plug is inserted into the hollow profile. The plug may comprise elements and or outer dimensions that are complementary to the inner dimensions of the first support beam to establish a plug connection in which the plug is arranged at least partially inside of the first support beam.

The engaging element is arranged at the plug, e.g. at a face of the plug facing away from the first support beam. The engaging element may be provided as part of the plug, e.g. a hook or protrusion of the plug, or it may be provided as a separate element that is fixable to the plug. The engaging element provides footing for the second support beam. For example, the second support beam may also be provided with a hollow profile and/or may comprise openings into which the engaging element may be inserted. In the position wherein the engaging element engages the second support beam, the second support beam may rest upon the engaging element and, thus, may be supported by the plug that is fixed to the engaging element. Thus, because the plug is plugged into the first support beam, the second support beam is fixed to the first support beam by the mounting device.

The mounting device may comprise further elements that enable fixing the plug at the first support beam at the different plug-positions. For establishing a secure connection, the plug may comprise fixing means for fixing the plug in and/or at the first support beam. The mounting device may be fixed to corresponding fixing means of the first support beam, e.g. one or more openings of the first support beam The mounting device provides at least two different plug-positions of the plug within the first support beam. These plug-positions differ in the position of the plug relative to the first support beam. For example, in a first of the plug-positions, the plug may not be plugged as much into the first support beam as in a second of the two plug-positions.

The two different plug-positions may comprise at least one plug-position, e.g. a first plug-position, in which the plug is only partially plugged into the first support beam. In this partially plugged plug-position, the plug may partially protrude from the first support beam. The at least two different plug-positions may further comprise at least one plug position, e.g. a second plug-position, where the plug is substantially fully and/or completely plugged into the first side beam. The plug may either be plugged as a whole into the first support beam or up to a stop of the plug that defines the plug-position in which the plug is plugged substantially fully into the first support beam.

In both of the plug-positions, the plug is fixable relative to the first support beam. Thus, even in the first plug-position, wherein the plug is not completely plugged into the first support beam, the second support beam is fixed relative to the first support beam. In this first plug-position, the mounting device provides clearance and/or space for arranging further parts of the rack. In the first plug-position, wherein the plug is only partially plugged into the first support beam, other elements of the rack may be fixed to the two support beams with sufficient clearance and space.

After these further elements of the rack are arranged, the plug may be brought into the other plug-position, e.g. its second plug-position, wherein the plug is plugged substantially completely into the first support beam. The second plug-position may correspond to a mounting position and/or operating position, in which the first support beam is arranged and fixed relative to the second support beam in its designated position within the rack.

Thus, the two different plug-positions correspond to two different beam-positions in which the second support beam is fixed relative to the first support beam in the two different beam-positions that allow a simplified construction of the rack. Thus, the mounting device provides an improved and simplified way to construct the rack.

According to one embodiment, the mounting device further comprises a key for fixing the plug in the first support beam, wherein the plug is fixable to the first support beam in the at least two different plug-positions by means of the key. The key may be provided as part of the plug, or it may be provided as a separate element of the mounting device. The key may be provided as an elongated member, for example as a wedge, which is insertable into openings of the first support beam so that it fixes and/or secures the plug in the plug-position inside of the first support beam. For establishing a secure connection, the plug may comprise receiving openings (as fixing means) into which the key may be inserted when fixing the plug in and/or at the first support beam.

The key may be inserted into one or two openings of the first support beam. Said openings may be provided as corresponding fixing means of the first support beam. In particular, said openings may be spaced apart from each other. Additionally, or alternatively, the key may be inserted in one or more receiving openings of the plug. For example, the key may be inserted into two openings of the first support beam and into two receiving openings of the plug. The key may be inserted into the first support beam and/or into the plug in a direction which is substantially perpendicular to the insertion direction of the plug into which the plug is inserted into the first support beam. Thus, the key may provide sufficient stability for fixing the plug inside the first support beam.

In both of the plug-positions, the plug is fixable relative to the first support beam by means of the key. Thus, after further elements of the rack are arranged in the first plug-position, the key may be removed, and the plug may be brought into its second plug-position (wherein the plug may be plugged substantially completely into the first support beam). In this second plug-position, the key may be inserted again so that the plug is fixed inside the first support beam in its second plug-position.

According to a further development of this embodiment, the plug comprises at least two sets of receiving openings into which the key is insertable for establishing the two plug positions. Each set of receiving openings may comprise at least one receiving opening, preferably at least two or exactly two receiving openings. The receiving openings of each set may be arranged spaced apart from each other to improve the stability of the plug connection. For example, the plug may comprise a first set of receiving openings into which the key is arranged in a first of the two plug-positions, and a second set of receiving openings into which the key is inserted in the second plug-position. The provision of receiving openings improve the stability of the plug connection. Furthermore, the receiving openings provide sufficient space for the key to engage. The receiving openings may be arranged at positions of the plug that correspond to positions of openings of the first support beam, so the key may be inserted at the same time into the respective set of receiving openings and into these openings of the first support beam.

In a further development of this embodiment, one set of receiving openings comprises a slit as one of the receiving openings. The slit (instead of a through-hole) eases a removing of the key out of the receiving opening of the plug. For example, the set of receiving openings that is used to fix the plug in the non-permanent plug position, for example the first plug-position, may comprise the receiving opening in form of a slit. This plug-position is predetermined as a non-permanent plug position that is only use during construction of the rack. After most or some elements of the rack are brought into their respective position, the key is moved out of this set of receiving openings, wherein the slit eases removal of the key. However, the other set of receiving openings, in particular the set of receiving openings for the predetermined permanent connection, e.g. the second plug-position, may comprise through-holes as receiving openings which strengthens the grip of the key in this set of receiving openings. Furthermore, the slit may be used to further secure the plug at the first support beam by means of an additional fastening element, e.g. a plug screw etc.

According to an embodiment, a first of the at least two plug positions differs from a second of the at least two plug positions by at least 1 cm, preferably by at least 2 cm. The difference is measured as a different position of the plug relative to the first support beam. This corresponds to a difference of the distance of the second support beam relative to the first support beam by the at least 1 cm, preferably by the at least 2 cm. This distance may provide sufficient clearance and space to ease the construction of the rack.

According to an embodiment, the plug comprises an upper arm and a lower arm for establishing a plug connection of the plug in the end of the first support beam. Herein, the upper arm may be arranged above the lower arm in the mounting position and/or respective plug-position. In other words, a plug may be provided in form of a clevis and/or bracket comprising at least two clevis arms as the upper and lower arm. The two arms are inserted into the first support beam while a base of the plug may serve as a stop to limit insertion of the plug into the first support beam. The two arms may provide sufficient stability and grip for the plug inside the first support beam. Further arms or sections of the plug may be omitted that would increase the weight and the friction without significantly improving the stability of the plug connection.

In a further development of this embodiment, each set of receiving openings comprises at least one receiving opening in the upper arm and at least one receiving opening in the lower arm of the plug. In this embodiment, the key may be inserted into a first receiving opening in the upper arm and in a second receiving opening in the lower arm. Thus, the plug is fixed inside of the support beam by the key protruding through said at least two receiving openings.

According to a further development of this embodiment, the receiving openings of the different sets of receiving openings are spaced apart from each other along the upper arm and along the lower arm in an insertion direction of the plug. The insertion direction of the plug corresponds to the direction into which the plug is inserted into the end of the first support beam. The receiving openings of a first set may be spaced apart both along the upper arm and along the lower arm from the receiving openings of a second set in the insertion direction. Thus, simple and effective means are provided for establishing the two different plug-positions and securing the plug in the first support beam.

According to an embodiment, in a mounting position, the engaging element is arranged at a face of the plug facing away from the first support beam. In the embodiment wherein the plug is provided as a clevis and/or bracket, the engaging element may be arranged at the base of the clevis facing away from the first support beam. Thus, a footing and/or rest is provided by the engaging element for the second support beam.

According to an embodiment, the engaging element is provided as a separate element of the mounting device that is fixable to the plug in at least two different engaging-positions. The two different engaging-positions correspond to two different positions of the engaging element relative to the plug. These two different engaging-positions may differ in that the engaging element is arranged at two different heights in the respective two different engaging-positions at the plug. This enables the mounting of the second support beam relative to the first support beam at at least two different heights at the mounting device and, thus, at the first support beam. Thus, e.g., load beams may be arranged at a different height than unload beams of the rack.

According to a further development of this embodiment, the plug comprises pin openings for fixing the engaging element relative to the plug in two predetermined heights corresponding to the at least two different engaging-positions. Herein, the pin openings may define the at least two different engaging-positions. For example, the engaging element may comprise pins that are inserted into some of the pin openings to establish the respective engaging position. Depending on the selection of pin openings into which the pins of the engaging element are inserted, the engaging element is arranged at a different height relative to the plug. The engaging element may be fixed to the plug by a further fixing means, e.g. a screw and/or a hook, etc.

According to an embodiment, the key comprises a self-retaining surface in operative connection with at least one of the receiving openings. The self retaining surface is arranged at an angle relative to the insertion direction of the key into the first support beam so that it obstructs and/or impedes removing of the key. Thus, the key is secured in the first support beam.

A further aspect relates to a carton flow bed rack comprising at least a side beam and a first end beam, wherein the first end beam is mounted to a first end of the side beam by a first mounting device according to the previous aspect. Therein, the plug of the first mounting device is plugged into the first end of the first side beam in a predetermined plug-position. The engaging element of the first mounting device engages an opening of the first end beam. The engaging element of the first mounting device is fixed to the plug at a predetermined engaging-position. In the embodiment wherein the first mounting device comprises a key, said key of the first mounting device may be inserted into one set of receiving openings and into openings of the side beam.

The side beam corresponds to the first support beam, and the first end beam corresponds to the second support beam as referred to in the previous aspect. The first mounting device is used to connect the side beam to the first end beam.

According to an embodiment, the carton flow bed rack comprises a second end beam, wherein the second end beam is mounted to a second end of the side beam by a second mounting device according to the first aspect. Therein, the plug of the second mounting device is plugged into the second end of the first side beam in a predetermined plug-position. The engaging element of the second mounting device engages an opening of the second end beam. The engaging element of the second mounting device is fixed to the plug of the second mounting device at a predetermined engaging-position. In the embodiment wherein the second mounting device comprises a key, said key of the second mounting device may be inserted into one set of receiving openings and into openings of the side beam.

In other words, the side beam comprises two ends. At both of the ends, a mounting device according to the first aspect is connecting said ends to a respective end beam. One mounting device may be used at each side to connect the side beam at both the loading side of the carton flow bed rack and at the unloading side of the carton flow bed rack. The mounting device is, in particular, versatile in that one mounting device may be used at each side to connect the side beam at both opposite ends to different kinds of end beams, in particular to a loading end beam and to an unloading end beam of the carton flow bed rack.

In a further development of this embodiment, the first mounting device is identical to the second mounting device. Therein, the first end beam is arranged at the first end of the side beam, the second end beam is arranged at the second end of the side beam, and the first end beam is arranged at a different height than the second end beam. The height may be measured relative to the respective end of the side beam. In other words, identical mounting devices comprising identical plugs, keys and engaging elements are mounted to the side beam and provide connections for the two end beams at different heights.

However, the mounting devices may be arranged at different engaging-positions of the respective engaging element. Depending on the engaging-position of the engaging element relative to the respective plug, the end beams may be arranged at different heights.

Furthermore, the mounting devices may be arranged at different plug-positions of the respective plug. Depending on the respective plug-position of the two mounting devices, the plugs may be inserted fully or only partially into the ends of the side beam.

Another aspect of this disclosure relates to a method for connecting two support beams of a rack, in particular of a carton flow bed rack. The method may comprise the steps of:
  plugging a plug of a mounting device into an end of a first support beam of the rack;
  fixing the plug in the first support beam in a first of at least two different plug-positions, e.g., by means of a key;
  arranging an engaging element at the plug; and
  fixing a second support beam of the two support beams to the first support beam by engaging the engaging element with an opening of the second support beam.

The method may be implemented by a mounting device according to the first aspect. The above steps may be executed in a different order. For example, the second support beam may be fixed by the engaging element to the plug before the plug is plugged into the end of the first support beam in the first plug-position.

According to an embodiment, further elements of the rack are arranged while the plug is arranged in the first plug-position and, after the arrangement of these further elements of the rack, the plug is fixed to the end of the first support beam in a second of the at least two different plug-positions, e.g., by means of the key. Herein, the first plug-position may correspond to an only partially inserted plug-position, while the second plug position may correspond to a substantially completely inserted plug-position of the plug in the first support beam. As described in reference to the first aspect, the arrangement of the further elements of the rack in the first plug-position simplifies the construction of the rack.

The terms upper, lower, below, above, etc. as used herein refer to the reference system of the Earth in a mounting position of the rack and/or the mounting device.

The numbers and/or angles given in the claims and the description are not limited to the exact numbers and/or angles, but may include measurement inaccuracies within limits that still enable solving the underlying problem.

Embodiments of the invention are described with reference to the figures. Features of the embodiments shown in the figures may be combined with each other and/or further embodiments. Identical reference numbers identify identical or similar features of the embodiments.

DETAILED DESCRIPTION

Figure 1:
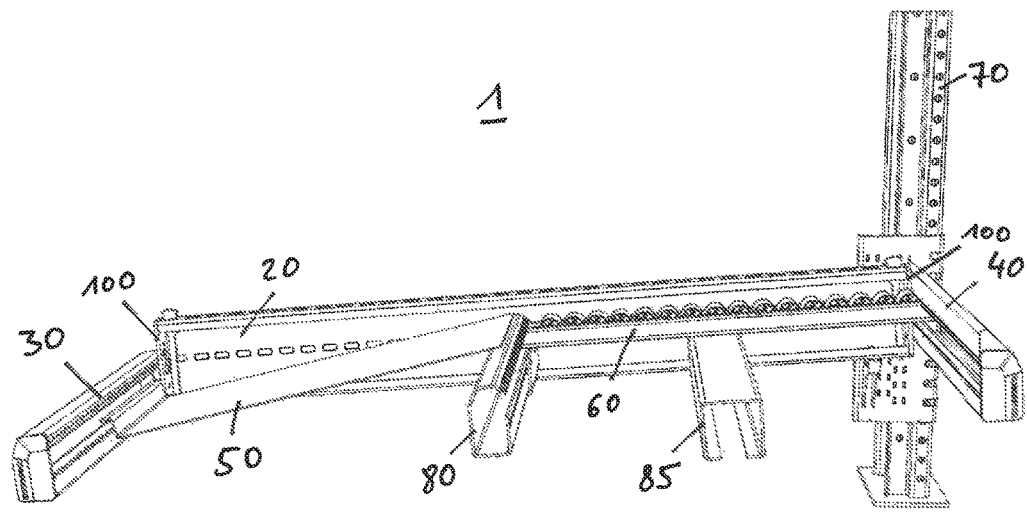
FIG. 1 a perspective view of a simplified carton flow bed rack, wherein beams are connected by mounting devices.

FIG. 1 shows a perspective view of a carton flow bed rack 1 wherein three different support beams are connected by mounting devices 100. Not all but only some elements of the carton flow bed rack 1 are shown to enable a better view of the different elements.

The carton flow bed rack 1 is supported by at least one support pole 70 arranged in a substantially vertical direction. A base of the support pole 70 abuts the floor and supports the weight of the carton flow bed rack 1 at least partially. The carton flow bed rack 1 may comprise multiple support poles 70, in particular at least four support poles 70 arranged at the four corners of the substantially cubic carton flow bed rack 1.

The support pole 70 is connected to at least one side beam 20. The side beam 20 is implemented as a support beam and aligned in a substantially horizontal direction. Herein, the side beam 20 may be arranged at an inclination angle of about 1° to about 10°, e.g. of about 5°, from its upper side at the load end (right in FIG. 1) to its lower side at the unload end (left in FIG. 1). The side beam 20 is aligned substantially perpendicular to the support pole 70. FIG. 1 shows only a single side beam 20 at a far side of the carton flow bed rack 1. In the carton flow bed rack 1, a corresponding side beam at the opposite side of the carton flow bed rack 1, namely the side facing the viewer of FIG. 1, is omitted. Furthermore, the carton flow bed rack 1 shown in FIG. 1 comprises only a single level, similar to a rack comprising a single shelf. However, different embodiments of the carton flow bed rack may comprise a plurality of levels arranged substantially above each other in a vertical direction. In these carton flow bed racks, the at least one support pole 70 may support a plurality of side beams 20 arranged above each other.

At a first end of the side beam 20, in particular at its unload end, the side beam 20 is connected to an unload beam 30. The unload beam 30 is arranged in a substantially horizontal direction and substantially perpendicular to the side beam 20.

At the opposite (second) end of the side beam 20, in particular at its load end, the side beam 20 is connected to a load beam 40. The load beam 40 is arranged substantially horizontal and substantially perpendicular to the side beam 20.

At each of said two ends of the side beam 20, one of the mounting devices 100 is arranged to enable the connection with the respective further support beam, namely the load beam 40 or the unload beam 30. In other words, two mounting devices 10 are arranged at and/or attached to the two ends of the side beam 20.

Between the load beam 40 and the unload beam 30, the carton flow bed rack 1 may comprise at least one intermediate beam 80, and optionally at least one intermediate support 85, both of which are arranged substantially parallel to both the load beam 40 and the unload beam 30. The side beam 20, the load beam 40, the unload beam 30 and the intermediate beam 80 and the optional intermediate support 85 define and support a single level of the carton flow bed rack 1.

Between the load beam 40 and the intermediate beam 80, the carton flow bed rack 1 comprises at least one wheel track 60. The wheel track 60 may be supported by the intermediate support 85 and may comprise a plurality of wheels and/or rolls that support transporting a load, in particular a parcel and/or a carton, loaded onto the wheel track 60 at the load beam 40. The wheel track 60 is shown truncated and may be implemented longer, in particular some meters long. The wheel track 60 may comprise an inclination from the load side to the intermediate beam 80. At the load side of the carton flow bed rack 1, the wheel track 60 may protrude into the load beam 40, which may be provided as a hollow profile.

Supported by both the intermediate beam 80 and the unload beam 30, an unload tray 50 is arranged. The unload tray 50 abuts the wheel track 60 at the intermediate beam 80. A load, which is loaded onto the wheel track 60 at the load beam 40, may be transported by gravity by the inclined wheel track 60 to the intermediate beam 80 where it is transferred to the unload tray 50. The unload tray 50 is arranged in a tilted manner comprising an inclination that enables a sliding movement of a load from the higher end of the unload tray 50, arranged at the intermediate beam 80, towards the lower end of the unload tray 50, arranged at the unload beam 30. At said lower end of the unload tray 50, the unload beam 30 may provide a stop that limits further transportation of the load. Thus, the load may rest upon the unload tray 50 until it is unloaded at the unload beam 30. At the unload side of the carton flow bed rack 1, the unload tray 50 may protrude into the unload beam 30, which may also be provided as a hollow profile.

The load beam 40 and the unload beam 30 provide end beams of the carton flow bed rack 1. The side beam 20, the load beam 40 and the unload beam 30 provide support beams of the carton flow bed rack 1.

Different carton flow bed racks may comprise a plurality of wheel tracks 60 arranged substantially parallel to each other and/or a plurality of unload trays 50 at the same level. In these carton flow bed racks, a plurality of loads, in particular parcels and/or cartons, may be loaded at the load side in parallel, namely the side which ends at the load beam 40. The shown carton flow bed rack 1 supports loading cartons from one side (the load side) and unloading them from the opposite side (the unload side) of the carton flow bed rack 1. This build of the carton flow bed rack is sometimes referred to as FIFO—'first in first out'. In different embodiments, carton flow bed racks may support loading and unloading at the same side. These builds of the carton flow bed rack are sometimes referred to as LIFO—'last in first out'. The invention may be implemented as a LIFO and/or as a FIFO carton flow bed rack. A LIFO carton flow bed rack may be implemented without any unload tray 50, because each level of the carton flow bed rack will be loaded and unloaded at the same end beam. Therefore, in a LIFO carton flow bed rack, the loads may only be supported by wheel tracks 60 arranged between both opposite end beams. In another embodiment of a FIFO carton flow bed rack without unload tray, the loads may also be only supported by wheel tracks 60 between the load beam(s) and the respective unload beam(s).

In particular when arranging wheel tracks 60 between the end beams 30, 40 and/or the intermediate beam 80, it may be difficult to engage the wheel tracks 60 with its two opposite ends into both of the hollow profiles of said beams 30, 40, and/or 80.

Figure 2:
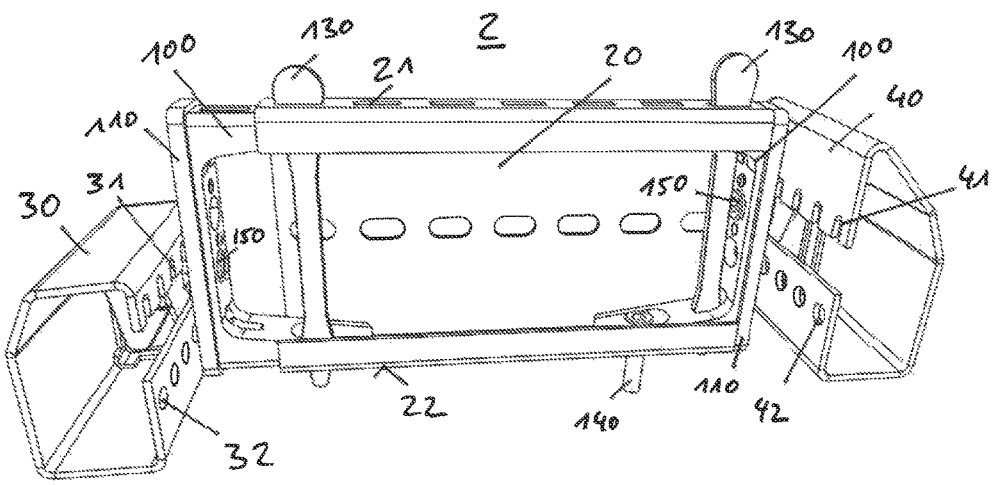
FIG. 2 a perspective view of a simplified rack, showing two mounting devices connecting a side beam to two end beams.

FIG. 2 shows a perspective view of a simplified rack 2, showing two mounting devices 100 connecting a side beam 20 (as a first support beam) to two end beams 30 and 40, e.g. the unload beam 30 and the load beam 40 (as further support beams). The rack 2 may be a carton flow bed rack and is shown truncated to enable a better view of the mounting devices 100. The rack 2 may comprise the same elements as the carton flow bed rack 1, in particular one or more support pole(s) 70, one or more intermediate beam(s) 80, one or more intermediate support(s) 85, one or more wheel track(s) 60, and/or one or more unload tray(s) 50. Furthermore, the rack 2 may be configured as the carton flow bed rack 1, in particular as a FIFO- and/or a LIFO-carton flow bed rack, wherein the side beams 20 may be slightly inclined as in the carton flow bed rack 1.

At the two opposite ends of the side beam 20, the mounting devices 100 are arranged to connect the end beams 30, 40 to the side beam 20. The mounting devices 100 may be implemented as physically similar or identical devices. Similar to the carton flow bed rack 1 shown in FIG. 1, the load beam 40 is arranged at the load end of the side beam 20 at a different height than the unload beam 30 at the unload end of the side beam 20. In the shown embodiment of the rack 2, the unload beam 30 is arranged lower than the load beam 40. However, both different height positions and/or installation heights of the respective end beams 30, 40 are supported and enabled by identical mounting devices 100.

In FIG. 2, the mounting devices are 100 are shown in two different plug positions.

The (left) mounting device 100 connecting the unload end of the side beam 20 to the unload beam 30 (at the left of FIG. 2) is shown in a first plug-position wherein it is only partially plugged into the side beam 20 and protrudes out of the unload end of the side beam 20. Thus, also the unload beam 30 is also spaced apart from the unload end of the side beam 20.

The (right) mounting device 100 connecting the load beam 40 to the load end of the side beam 20 (at the right of FIG. 2) is shown in a second plug-position wherein it is substantially fully plugged into the end of the side beam 20. Thus, also the load beam 40 is arranged substantially right next to the load end of the side beam 20.

In the shown embodiment, the (left) mounting device 100 protrudes about 24 mm further out of the unload end of the side beam 20 than the (right) mounting device 100 protrudes out of the load end of the side beam 20. The plug-position of the mounting device 100 at the unload end of the side beam 20 is also referred to as the first plug-position and/or a partially plugged-in plug-position. The plug-position of the mounting device 100 at the load end of the side beam 20 is also referred to as the second plug-position and/or the substantially fully/completely plugged-in plug-position.

The mounting devices 100 each comprise at least a plug 110 and a key 130. The plugs 110 of the mounting devices 100 may be fixed in the side beam 20 by means of the key 130. Respective receiving openings of the plug 110 enable the fixation of the plug in the side beam 20 in the different plug-positions.

Details of the mounting devices 100 are described in reference to the following figures.

Figures 3A, 3B:
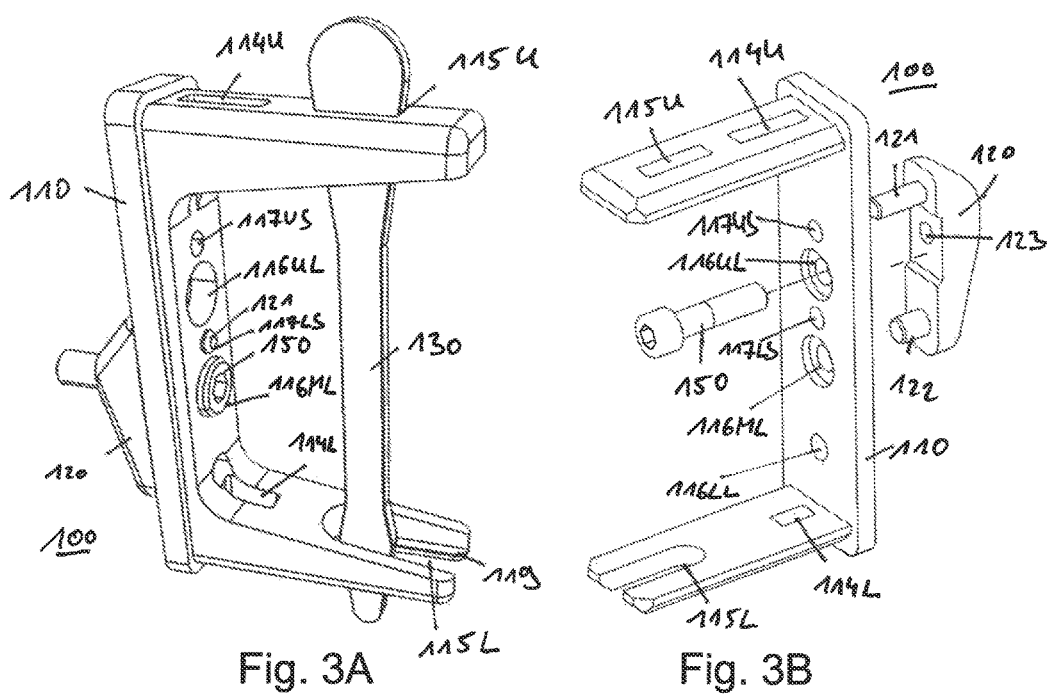
FIG. 3A a perspective view of a first mounting device.
FIG. 3B a perspective view of a second mounting device.

FIG. 3A shows a perspective view of a first embodiment of the mounting device 100. The mounting device comprises a plurality of separate elements.

In the shown embodiment, the mounting device 100 comprises a plug 110, an engaging element 120, and a key 130. The mounting device 100 may comprise further elements, for example a nut screw 150 and/or a plug screw 140 (as shown in FIG. 2). The engaging element 120 is fixed to the plug 110 by pins and/or the nut screw 150. The engaging element 120 may be fixed to the plug 110 at different height positions and/or engaging-positions. The engaging element 120 enables fixation of the end beam 30 and/or 40 (see FIG. 2) with respect to the plug 110 of the mounting device 100.

The key 130 enables fixation of the plug 110 within the side beam 20 in different plug positions of the plug 110.

FIG. 3B shows a perspective view of a second embodiment of the mounting device 100, wherein the key 130 is omitted. The mounting device 100 is shown in a state wherein the engaging element 120 is not yet fixed to the plug 110.

The mounting devices shown in FIGS. 3A and 3B may have similar components and/or elements, which is why their features are referred to with the same reference signs.

The elements of the mounting device 100 are further described in reference to the following figures.

Figure 4:
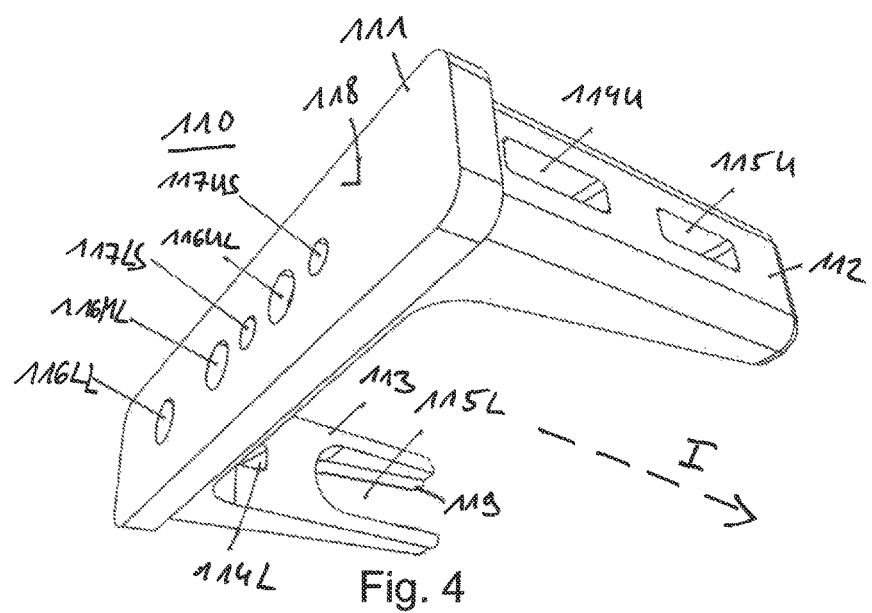
FIG. 4 a perspective view of a plug of the mounting device shown in FIG. 3A.

FIG. 4 shows a perspective view of the plug 110 of the mounting device 100. The plug 110 comprises a base 111 which may be implemented as the base of a clevis and/or bracket. The base 111 may be shaped as a substantially rectangular plate. The shape of this plate and/or the base 111 may substantially correspond to the cross-section of the side beam 20. In particular, a shape of the base 111 may be implemented slightly larger than the cross-section of the side beam 20. Thus, the base 111 may serve as a stop that prevents the plug 110 from being inserted into the side beam 20 even past the base 111. Thus, the base 111 extends in one or all directions perpendicular to an insertion direction I past the inner diameter of the side beam 20 in its cross-section. Furthermore, the base 111 may be implemented as an end cap of the side beam 20.

Herein, the insertion direction I is also indicated in FIG. 4 and corresponds to a substantially straight direction into which the plug 110 is moved when plugging the plug 110 in the end of the side beam 20. Thus, the insertion direction I is substantially parallel to the extension direction of the side beam 20.

The plug 110 may be substantially shaped as a clevis and/or bracket with the base 111 as the base of the clevis. As clevis arms, the plug 110 comprises an upper arm 112 and a lower arm 113. The two arms 112 and 113 are arranged substantially perpendicular to the plane defined by the base 111. They extend from the base 111 substantially parallel to the insertion direction I. The two arms 112 and 113 extend from an inner face of the base 111, which faces the side beam 20 in a mounting position and/or operation position of the mounting device 100. The base 111 comprises an outer face 118 facing away from the side beam 20 in the mounting position of the mounting device 100 and also facing away from the arms 112 and 113.

The lower arm 113 may have substantially the same length as the upper arm 112 in insertion direction I. Furthermore, both arms 112, 113 may have a substantially similar thickness. The arms 112 and 113 may be formed as one piece together with the base 111. In other words, the whole plug 110 may be formed as one piece, e.g. molded from durable plastics. In another embodiment, the two arms 112 and 113 may be formed as separate elements and attached to the base 111. In this embodiment, the plug 110 may be, e.g., provided as metallic element of the mounting device 100.

The arms 112 and 113 comprise at least two sets of receiving openings. As a first set of receiving openings, the upper arm 112 comprises an outer upper key opening 115U. As part of the same first set, the lower arm 113 comprises an outer lower key opening 115L. The two outer key openings 115U and 115L provide the first set of receiving openings of the plug 110.

Furthermore, the arms 112 and 113 comprise a second set of receiving openings. As second set of receiving openings, the upper arm 112 comprises an inner upper key opening 114U. The lower arm 113 comprises a inner lower key opening 114L. The two inner key openings 114U and 114L provide the second set of receiving openings of the plug 110. Both of these inner key openings 114U and 114L are provided as through-holes. All of the receiving openings 114L, 114U, 115L, and 115U comprise an inner diameter that allows access for the key 130.

The inner key openings 114L, 114U of the second set are arranged closer to the base 111 than the outer key openings 115L, 115U of the first set.

The outer lower key opening 115L may be formed as a slit and not as a through-hole as the other receiving openings of the plug 110. This shape of the outer lower key opening 115L may enable at least one of the following effects: On the one hand, it may allow a simply removal of the key 130 out of the first set of receiving openings 115L, 115U (namely from its position as shown in FIG. 3A). The key 130 is engaging this first set of receiving openings when the mounting device 100 is in its first plug-position, as shown on the left-hand side of FIG. 2. This first plug-position is not its final mounting/operating position, but only an assembly position for the rack 2. Therefore, they key 130 will later be removed from the first set of receiving openings.

On the other hand, the slit-shape of the outer lower key opening 115L may provide another effect. The lower outer key opening 115L may further comprises a rim 119. The rim 119 is arranged at a lower end of the outer lower key opening 115L as a protrusion. As shown in FIG. 2, the plug screw 140 may be inserted and screwed into the outer lower key opening 115L, thereby fixing the plug 110 further in the second plug-position shown at the right-hand side of FIG. 2. The plug screw 140 serves as a further securing mechanism of the mounting device 100 in its substantially fully plugged-in plug-position. In this second plug-position, the plug screw 140 is fixing the rim 119 of the lower outer key opening 115L on a lower section of the side beam 20. For this, this plug screw 140 may be inserted and screwed to a lower side beam opening 22 (see FIG. 2).

This first plug-position may be used to add further elements of the rack 2, for example the unload tray 50 and/or the wheel tracks 60. However, after assembling these further elements of the rack 2, the key 130 is removed from the first set of receiving openings and the plug 110 is moved further into the side member 20. In other words, the key 130 should be easily removable out of the first set of receiving openings 115U and 115L. The implementation of the lower outer key opening 115L as a slit may enable such an easy removal of the key 130 and that it reduces the friction necessary to remove the key 130.

In the second plug position shown at the right-hand side of FIG. 2, the key 130 is inserted into the second set of receiving openings, namely into the inner key openings 114L and 114U. In both plug-positions shown in FIG. 2, the key 130 is not only inserted into the respective set of receiving openings of the plug 110, but also into one upper side beam opening 21 and into one lower side beam opening 22. In other words, in each plug-position, the key 130 may be inserted into and through four different openings, namely two openings of the side beam 20 and two openings of the plug 110.

All of the receiving openings 114L, 114U, 115L, and 115U may comprise an opening with an elongated inner diameter, e.g. a substantially rectangular inner diameter. The elongated form of the receiving openings prevents twisting of the key 130 when inserted in the respective set of receiving openings.

The base 111 comprises a plurality of pin openings that allow arrangement and fixing of the engaging element 120 to the base 111. In the embodiment shown in FIG. 4, the base 111 comprises three larger pin openings 116LL, 116ML, and 116UL and, furthermore, two small pin openings 117LS and 117US.

As large pin openings, the base 111 comprises a lower large pin opening 116LL, a middle large pin opening 116ML and an upper large pin opening 116UL. As small pin openings, the base 111 comprises a lower small pin opening 117LS and an upper small pin opening 117US. Depending on the engaging position of the engaging element 120 with respect to the plug 110, pins of the engaging element 120 are inserted into different pin openings 116LL, 116ML, 116UL, 117LS, and 117US.

The names of the pin openings reflect their relative position at the base 111. Thus, the upper small pin opening 117US is arranged at the uppermost position of all the pin openings. Below the upper small pin opening 117US, the upper large pin opening 116UL is arranged, below which the lower small pin opening 117LS is arranged. Between said lower small pin opening 117LS and the lower large pin opening 116LL, the middle large pin opening 116ML is arranged. All of these pin openings comprise an substantially circular inner diameter in the cross-section that allows access for a pin of the engaging element 120 (see pins 121 and 122 shown in FIG. 5). Herein, all the large pin openings 116LL, 116ML, 116UL comprise substantially the same inner diameter. Furthermore the two small pin openings 117LS, 117US comprise substantially the same inner diameter which is smaller than the inner diameter of the large pin openings 116LL, 116ML, 116UL.

As shown in FIG. 3A, not all of the large pin openings need to be implemented as through-holes (as in the embodiment shown in FIG. 3B). In the embodiment shown in FIG. 3A, only the upper large pin opening 116UL and the middle large pin opening 116ML are implemented as through-holes, while the lower large pin opening 116LL does not penetrate the base 111 fully.

However, all of the small pin openings 117LS, 117US may be implemented as through-holes.

Figure 5:
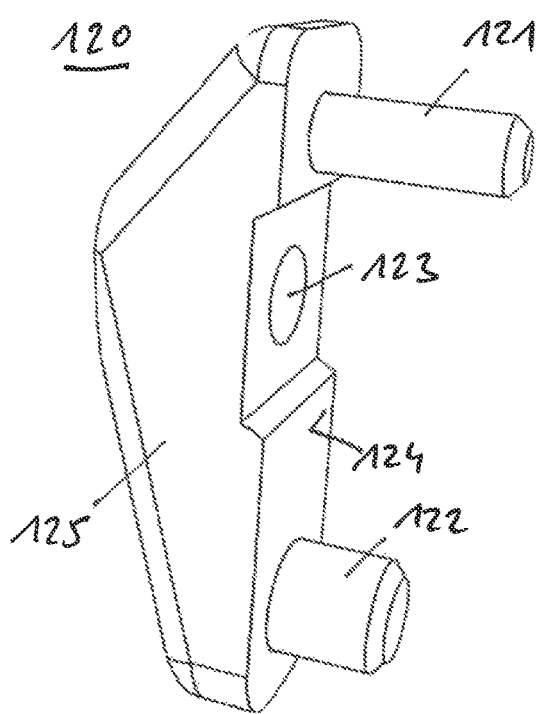
FIG. 5 a perspective view of an engaging element of the mounting device shown in FIG. 3A.

FIG. 5 shows a perspective view of the engaging element 120 of the mounting device 100. The engaging element 120 comprises a main body 125. The main body 125 comprises an inner face 124 facing the outer face 118 of the plug 110 in a mounting position and/or operating position of the mounting device 100. Herein, the inner face 124 of the main body 125 may be substantially planar.

Also, the outer face 118 of the plug 110 may be substantially planar. The main body 125 comprises fixing elements, e.g. at least two pins 121 and 122. Therein, the upper pin 121 comprises a smaller diameter than the lower pin 122. In the mounting position of the mounting device 100, the two pins 121, 122 are arranged substantially parallel to the insertion direction I of the plug 110.

Furthermore, the pins 121, 122 may be substantially formed like a circular cylinder, wherein the outer diameter of the upper pin 121 may substantially correspond to the inner diameter of the two small pin openings 117US, 117LS of the plug 110. Furthermore the outer diameter of the lower pin 122 may substantially correspond to the inner diameter of the three large pin openings 116LL, 116ML, and 116UL of the plug 110. Herein, the respective pin openings 116LL, 116ML, 116UL, 117US, and 117LS are formed and/or shaped to allow the pins 121 and 122 access into the hollow section of the pin openings 116LL, 116ML, 116UL, 117US, and 117LS.

The main body 125 further comprises a through-hole 123 comprising an inner diameter that substantially corresponds to the inner diameter of the large pin holes 116LL, 116ML, 116UL and the outer diameter of the lower pin 122. The through-hole 123 allows securing the engaging elements 120 at the plug 110 by means of the nut screw 150 (see FIGS. 3A and 3B). The engaging element 120 may be provided as a nut.

The engaging element 120 may be arranged at the plug 110 in at least two different engaging-positions. These engaging-positions correspond to two different height positions of the engaging element 120 relative to the plug 110. In a lower engaging-position, the lower pin 122 is inserted into the lower large pin opening 116LL, while the upper pin 121 is inserted into the lower small pin opening 117LS. The nut screw 150 may be inserted through the middle large pin opening 116ML and through the through-hole 123 of the main body 125. This position of the engaging element 120 relative to the plug 110 may be referred to as the lower engaging-position.

In a further engaging-position, also referred to as the upper engaging-position, the lower pin 122 is inserted into the middle large pin opening 116ML, and the upper pin 121 is inserted into the upper small pin opening 117US. The nut screw 150 may be inserted through the upper large pin opening 116 UL and through the through-hole 123.

Examples of the two different engaging-positions of the engaging element 120 are shown in FIG. 2: At the left hand, the engaging element 120 of the mounting device 100 is arranged in its lower engaging-position, as shown by the inner end of the nut screw 150 within the middle large pin opening 116ML. In the mounting device 100 at the right side of FIG. 2, the engaging element 120 is arranged at its upper engaging-position, as can be seen by the position of the nut screw 150 within the upper large pin opening 116UL. Furthermore, the lower engaging-position is also shown in FIG. 3A.

Figure 7A:
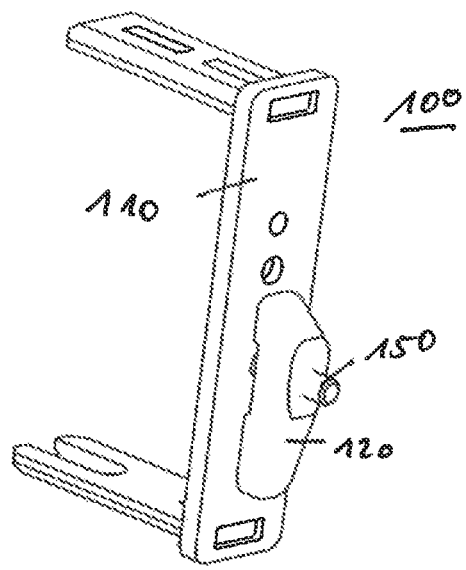
FIG. 7A a perspective view of a mounting device shown in FIG. 3B in its lower engaging-position.
Figure 7B:
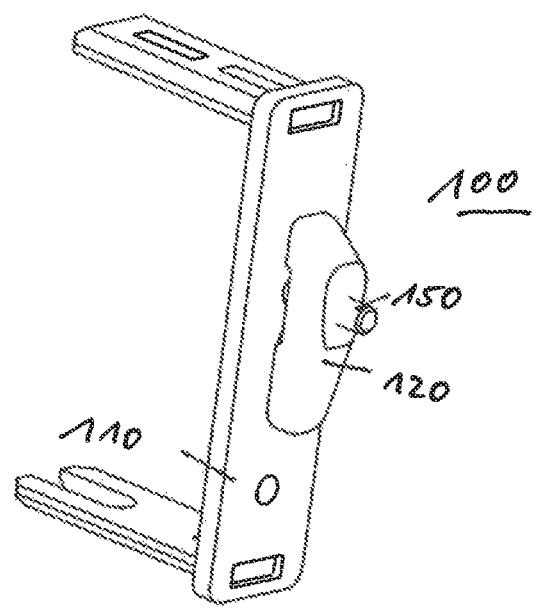
FIG. 7B a perspective view of a mounting device shown in FIG. 3B in its upper engaging-position.

Examples of the two different engaging-positions are also shown in FIGS. 7A and 7B.

The engaging element 120 serves as a foothold and/or rest for the respective end beam 30 or 40 of the rack 2. In its mounting position, the lower pin 122 may also be inserted into one of the lower unload beam openings 32, thus fixing a lower rim of the unload beam 30 between the main body 125 of the engaging element 20 and the plug 110, in particular the base 111 of the plug 110. Furthermore, the upper pin 121 may be inserted into one of the upper unload beam openings 31 of the unload beam 30. After fixing the nut screw 150, the unload beam 30 is, thus, fixed to the mounting device 100.

Similarly, also at the load beam 40, the lower pin 122 of the engaging element of the mounting device 100 (shown at the right hand side of FIG. 2) is inserted through one of the lower load beam openings 42. The upper pin 121 of the right-hand side mounting device 100 is inserted into one of the upper load beam openings 41 of the load beam 40. Thus, the load beam 40 is fixed to the mounting device 100 shown at the right hand side of FIG. 2.

Figure 6:
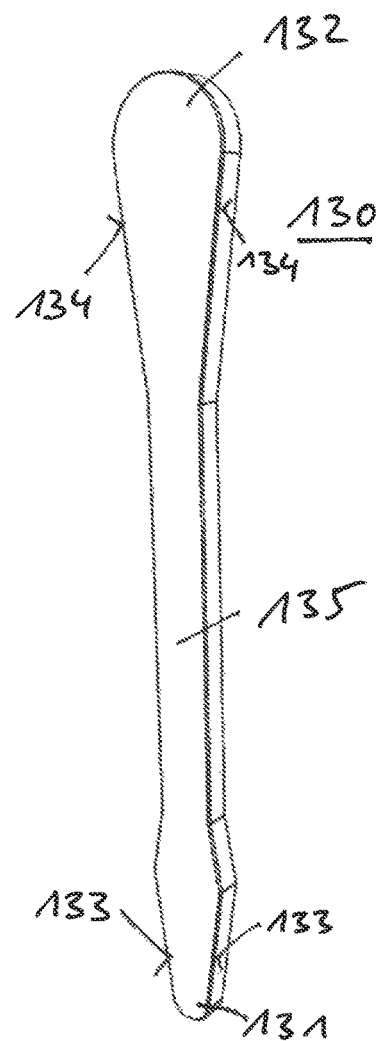
FIG. 6 a perspective view of a key of the mounting device shown in FIG. 3A.

FIG. 6 shows a perspective view of the key 130 of the mounting device 100. The key 130 comprises an elongated body 135 connecting a tip 131 of the key 130 to an end stop 132 of the key 130. In a mounting position of the mounting device 100, the key 130 is arranged substantially vertically in the reference system of the earth, wherein its tip 131 points downwards. The cross-section of the key 130 is substantially rectangular so that the key 130 to prohibit twisting around a vertical access when inserted into the receiving openings of the plug 110 and/or the side beam openings 21, 22 of the side beam 20.

The end stop 132 comprises an outer diameter in its cross-section that is larger than the inner diameter of the upper side beam openings 21 and/or larger than the receiving openings of the upper arm 112. Thus, the end stop 132 is prevented from falling through the side beam openings 21, 22 and/or the receiving openings of the plug 110.

At the end stop 132, the key 130 may comprise lateral stop surfaces 134 which are inclined so that they may abut a corresponding surface within the upper key openings 114U and 115U of the upper arm 112. The key 130 may further comprise lateral tip surfaces 133 at the tip 131 to enable a precise fitting and abutting in the lower receiving openings 114L and 115L of the lower arm 113.

The embodiment of the mounting device 100 shown in the figures is an exemplary embodiment. In other embodiments, the elements of the mounting device 100 may be arranged slightly different. For example, the plug 110 may comprise further sets of receiving openings. Also, the diameters of the upper pin 121 and the lower pin 122 may be the other way around, for example comprising a larger outer diameter at the upper pin and a smaller outer diameter at the lower pin. In another embodiment, the two pins 121 and 122 may comprise the same diameter, for example the same diameter as the through-hole 123. However, in the embodiments wherein the different pin diameters are different, construction errors may be reduced.

The engaging element 120 may be provided with different fixing means than the pins 121, 122 and the through-hole 123 to enable secure fastening of the main body 125 at the plug 110 at different heights. The base 111 of the plug 110 may comprise corresponding fixing means.

In an embodiment, the base 111 may comprise more or less pin openings 116LL, 116ML, 116UL, 117US, and 117LS to enable at least two or more engaging-positions of the engaging element 120.

When constructing the rack 2 shown in FIG. 2 and or the rack 1 shown in FIG. 1, at each end of each side beam 20, a plug 110 is inserted into the end of the side beam 20. At a first stage of constructing the rack 2, one or all of the plugs 110 may be arranged in their first plug-position as shown at the left hand side of FIG. 2. In this partially inserted plug-position, the key 130 is inserted into the first set of receiving openings, namely the outer key openings 115L and 115U. The two outer key openings 115U and 115L are arranged at a larger distance from the base 111 than the inner key openings 114L and 114U. In other words, the set of inner key openings 115U and 115L are arranged spaced apart from the inner key openings 114U and 114L along the insertion direction I.

In this first plug position, the plug 110 protrudes from the respective end of the side beam 20 for at least 1 cm, or, as shown in FIG. 2, for about 24 mm plus the thickness of the base 111. In this first plug-position, all end beams 30 and 40 may be fixed to the respective mounting devices 100 as described above. After arranging all the end beams 30 and 40 of the same level, the inner elements of the level may be arranged, for example the unload tray 50 and the wheel tracks 60. Since these elements have to be inserted into the inner hollow profile of the end beams 30 and 40, the first plug-position simplifies constructing and/or assembling of the carton flow bed rack 2.

After some or all of these inner elements like the tray 50 and the wheel track 60 are arranged, the key 130 is removed and the plug 110 is plugged further into the respective end of the side beam 20. For example, the plug 110 may be moved 24 mm into the hollow profile of the side beam 20 until its base 111 prevents further intrusion of the arms 112 and 113 into the inside of the side beam 20. In this fully plugged-in plug-position, namely its second plug-position, the key 130 is inserted through one of the upper side beam holes 21, through the upper inner key opening 114U, through the lower inner key opening 114L and through one of the lower side beam openings 22, in said order, with its tip 131 first. After inserting the key 130, the mounting device 100 is already fixed to the respective end of the side beam 20. As further improvement of the stability, the plug screw 114 may be screwed through the outer lower key opening 115L and through one of the lower side beam openings 22. The slotted form of the outer lower key opening 115L enables sufficient clearance and/or access for the plug screw 114.

FIG. 7A shows a perspective view of the mounting device shown in FIG. 3B in its lower engaging-position.

FIG. 7B shows a perspective view of the mounting device shown in FIG. 3B in its upper engaging-position. Therein, the engaging element 120 is arranged above its position in the lower engaging-position shown in FIG. 7A.

Figure 8A:
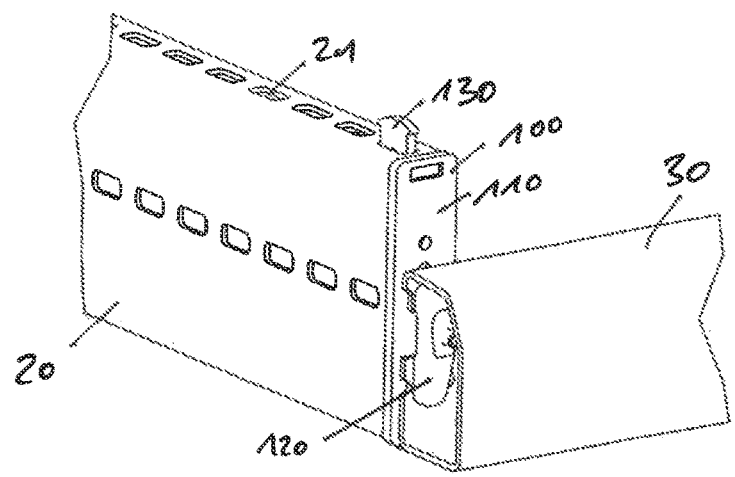
FIG. 8A a perspective view of a detail of a carton flow bed rack wherein an end beam is connected to a side beam providing a low end of the rack.
Figure 8B:
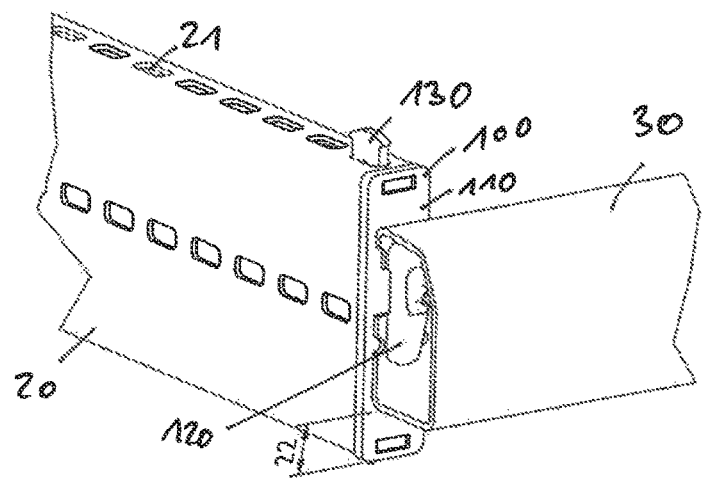
FIG. 8B a perspective view of a detail of a carton flow bed rack wherein an end beam is connected to a side beam providing a medium end of the rack.
Figure 8C:
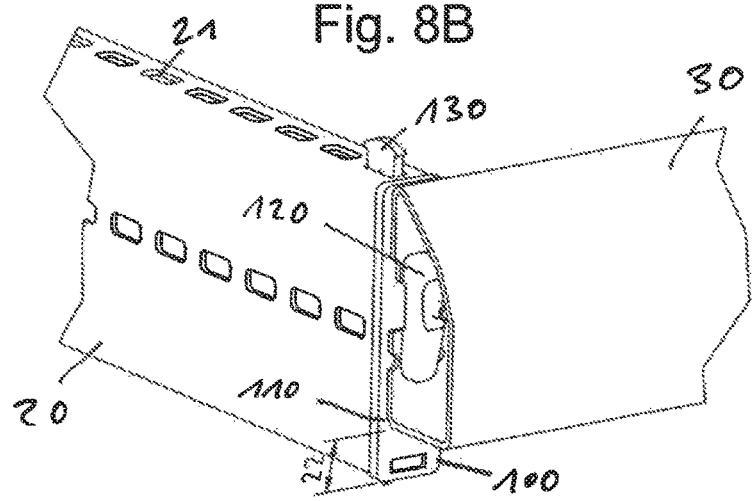
FIG. 8C a perspective view of a detail of a carton flow bed rack wherein an end beam is connected to a side beam providing a high end of the rack.

FIGS. 8A to 8C show perspective views of a detail of the carton flow bed rack 1 or 2, wherein an end beam 30 is connected to the side beam 20 by the mounting device 100, thereby providing an end of the carton flow bed rack 1, 2.

In FIG. 8A, the engaging element 120 is fixed to the plug 110 in its lower engaging-position, thereby connecting the end beam 30 comprising a low upper rim to the side beam 20. Thereby, the unload beam 30 may be arranged so that it provides an inclination from about 10° to about 15° for the loads for the loads within this level of the carton flow bed. Said inclination my be provided by an unload tray 50 and/or by wheel tracks 60 ending at the unload beam 30.

In FIG. 8B, the engaging element 120 is fixed to the plug 110 in its upper engaging-position, thereby connecting the end beam 30 comprising a low upper rim to the side beam 20. Thereby, the unload beam 30 may be arranged so that it provides an inclination of about 5° for the loads within this level of the carton flow bed. Said inclination my be provided by an unload tray 50 and/or by wheel tracks 60 ending at the unload beam 30.

In FIG. 8C, the engaging element 120 is fixed to the plug 110 in its upper engaging-position, thereby connecting the end beam 30 comprising a high upper rim to the side beam 20. Thereby, the unload beam 30 may be arranged so that it provides no inclination for the loads within this level of the carton flow bed. One or more unload tray(s) 50 and/or wheel track(s) 60 ending at the unload beam 30 my be arranged without inclination. Such a connection could also be provided at the load end of the side beam 20, e.g. at the load beam 40 shown in FIG. 1 and FIG. 2.

Figure 9A:
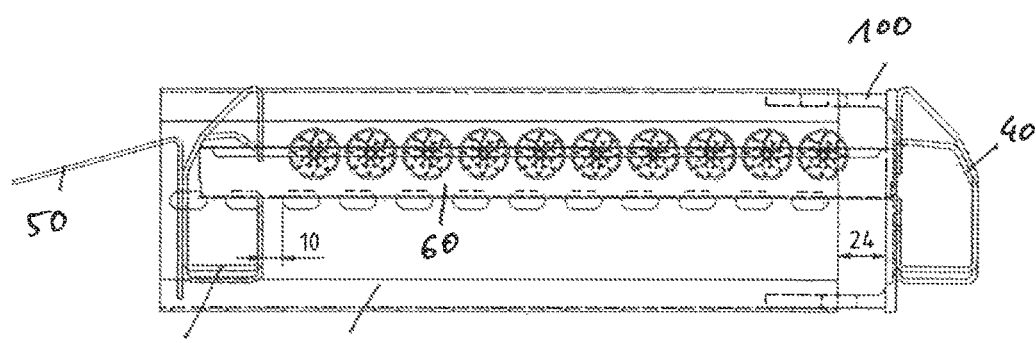
FIG. 9A-9C a side views within a single level of a carton flow bed rack at different construction steps.
Figure 9B:
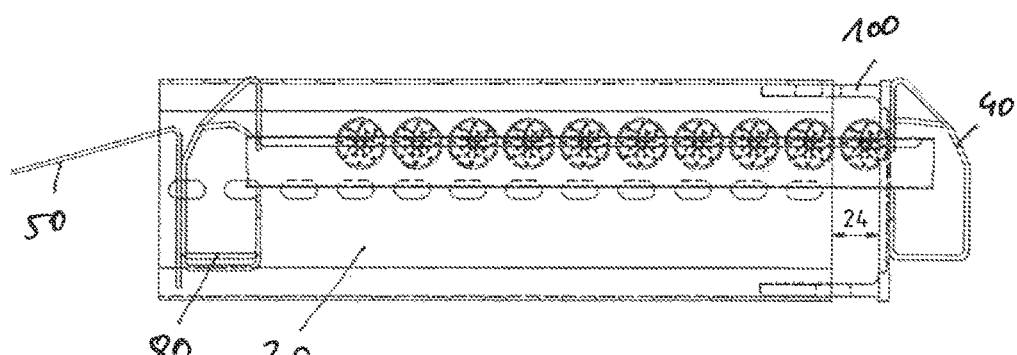
Figure 9C:
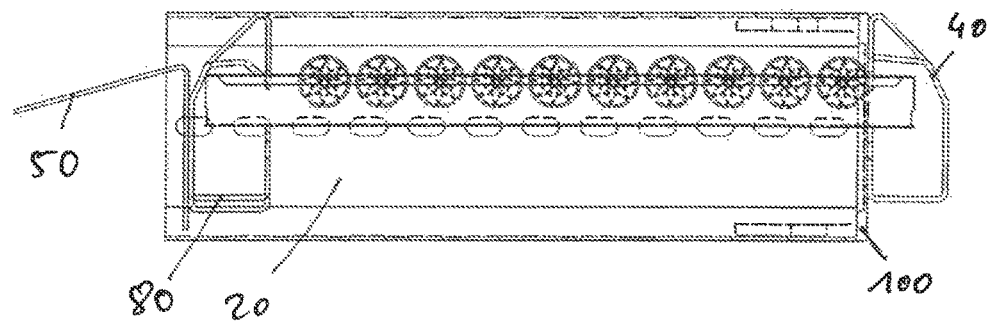

FIGS. 9A to 9C show side views of details within a single level of the carton flow bed rack 1, 2 at different construction steps. Therein, a wheel track 60 is inserted into a level of the carton flow bed 1, 2 between a load beam 40 and an intermediate beam 80. At the end of the side beam 20 facing the load beam 40, namely at the load end of the side beam 20, a mounting device 100 is arranged.

In a first step shown in FIG. 9A, the mounting device 100 is arranged in its first plug-position, wherein the plug 110 partially protrudes from the load end of the side beam 20, thereby providing space for a wheel track 60. The wheel track 60 is moved as far as possible into the hollow section of the intermediate beam 80. Because the mounting device 100 is in its first plug-position, the opposite end of the wheel track 60 at the load end of the side beam 20 may be moved substantially parallel to the side beam 20 and easily be entered into the hollow section of the load beam 40.

This is shown in FIG. 9B, as a second construction step. Herein, the mounting device 100 is still arranged in its first plug-position protruding from the load end of the side beam 20. Here, the wheel track 60 is moved further into the hollow section of the load beam 40. Thus, the wheel track 60 may securely rest upon both the intermediate beam 80 and the load beam 40.

Afterwards, the key 130 (not shown in FIG. 9) is removed, and the plug 110 of the mounting device 100 is pushed further and/or as far into the load end of the side beam 20 as possible, namely until the base 111 stops further intrusion of the plug 110.

This situation is shown in FIG. 9C. In this second plug-position, the key 130 may be inserted back into the side beam 20 and into the second set of receiving openings of the plug 110. Thus, the mounting device 100 is substantially fully plugged into the side beam 20.

In this mounting position, the wheel track 60 may rest securely on both the intermediate beam 80 and the load beam 40, protruding into both of these beams 40, 80.

The same construction steps may be applied when assembling a wheel track 60 and/or unload tray 50 between the load beam 40 and the end beam 30, and/or between the unload beam 30 and the intermediate beam 80.

In an embodiment, the wheel tracks 60 comprise a free end on one side and a wheel end on the opposite end. For example, the end of the wheel track shown in FIG. 9 comprises a free end at the intermediate beam 80, and a wheel end at the load beam 40. At free end, one wheel less is arranged to provide space to improve assembling the rack 1,2. In FIGS. 9A-9C, the wheel track 60 is arranged with its wheel end at the load beam 40.

In an embodiment, the wheel tracks 60 of one level of the carton flow bed rack 1, 2 may be arranged in a staggered manner. Therein, adjacent wheel tracks 60, that are arranged substantially parallel to each other, are arranged alternating. Herein, a first wheel track 60 is arranged with its free end at the intermediate beam 80, a second wheel track 60 is arranged with its free end at the load beam, and so on. This arrangement increases the wheel distribution within the level of the carton flow bed 1, 2.

LIST OF REFERENCE NUMERALS

1 carton flow bed rack
2 rack
20 side beam
21 upper side beam opening
22 lower side beam opening
30 unload beam
31 upper unload beam opening
32 lower unload beam opening
40 load beam
41 upper load beam opening
42 lower load beam opening
50 unload tray
60 wheel track
70 support pole
80 intermediate beam
85 intermediate rest
100 mounting device
110 plug
111 base
112 upper arm
113 lower arm
114L inner lower key opening
114U inner upper key opening
115L outer lower key opening
115U outer upper key opening
116LL lower large pin opening
116ML middle large pin opening
116UL upper large pin opening
117LS lower small pin opening
117US upper small pin opening
118 outer face
119 rim
120 engaging element
121 upper pin
122 lower pin
123 through-hole
124 inner face
125 main body
130 key
131 tip
132 end stop
133 lateral tip surface
134 lateral stop surface
135 elongated body
140 plug screw
150 nut screw
I insertion direction

What is claimed is:

1. A mounting device (100) for connecting a first substantially horizontally aligned support beam (20) to at least a second substantially horizontally aligned support beam (30, 40) of a carton flow bed rack (1; 2), comprising:
  a plug (110) having an upper arm (112) and a lower arm (113) that are pluggable into a first end of the first support beam (20) for establishing a plug connection of the plug (110) in the first end of the first support beams (20), upper and lower sets of receiving openings (114L, 114U, 115L, 115U) disposed respectively in the upper and lower arms (112, 113);
  a key (130) having a wedge-shaped portion and being insertable into one of the receiving openings (114U, 115U) in the upper arm (112) and one of the receiving openings (114L, 115L) in the lower arm (113) for fixing the plug (110) in the first support beam (20); and
  an engaging element (120) arranged at the plug (110), wherein the engaging element (120) is provided to engage the second support beam (30; 40);
  wherein:
  the plug (110) is fixable to the first end of the first support beam (20) in at least first and second plug-positions by means of the key (130), the plug (110) being plugged only partially into the first support beam when the plug (110) is in the first plug-position, and the plug (110) being plugged fully into the first support beam when the plug (110) is in the second plug-position, and
  the plug (110) has the upper and lower sets of receiving openings (114L, 114U, 115L, 115U) disposed respectively in the upper and lower arms (112, 113) and into which the key (130) is insertable for establishing the first and second plug-positions.

2. The mounting device (100) of claim 1, wherein one of the at least two sets of receiving openings (115L, 115U) comprises a slit as the receiving opening (115U).

3. The mounting device (100) of claim 1, wherein the first plug-positions differs from the second plug-positions by at least 1 cm.

4. The mounting device (100) of claim 1, wherein the receiving openings (114L, 114U, 115L, 115U) in each of the sets of receiving openings (114L, 114U, 115L, 115U) are spaced apart from each other along the upper arm (112) and along the lower arm (113) in an insertion direction of the plug (110).

5. The mounting device (100) of claim 1, wherein, in a mounting position, the engaging element (120) is arranged at a face of the plug (110) facing away from the first support beam (20).

6. The mounting device (100) of claim 5, wherein the engaging element (120) is provided as a separate element of the mounting device (100) that is fixable to the plug (110) in at least two different engaging-positions.

7. The mounting device (100) of claim 5, wherein the plug (110) comprises pin openings (116L, 116M, 116U, 117L, 117U) for fixing the engaging element (120) relative to the plug (110) in two predetermined heights corresponding to the at least two different engaging-positions.

8. A carton flow bed rack (1; 2), comprising at least a substantially horizontally aligned side beam (20) having opposite first and second ends, a substantially horizontally aligned first end beam (30) a substantially horizontally aligned second end beam (40), and first and second identical mounting devices (100), the first end beam (30) being mounted to a first end of the side beam (20) by the first mounting device (100) and the second end beam (40) being mounted to the second end of the side beam (20) by the second mounting device (100), each of the first and second mounting devices (100) comprising:
- a plug (110) pluggable into the respective end of the side beam (20);
- a key (130) having a wedge-shaped portion and being disposed for fixing the plug (110) in the respective end of the side beam (20); and
- an engaging element (120) arranged at the plug (110) and configured to engage the respective first or second end beam (30, 40);

wherein:
the plug (110) of the first mounting device (100) is plugged into the first end of the side beam (20) and is fixable by the key (130) of the first mounting device (100) in at least first and second predetermined plug-positions, the plug (110) of the first mounting device (100) being plugged only partially into the first end of the side beam (20) when the plug (110) of the first mounting device (100) is in the first plug-position, and the plug (110) of the first mounting device (100) being plugged fully into the first end of the side beam (20) when the plug (110) of the first mounting device (100) is in the second plug-position;

the engaging element (120) of the first mounting device (100) engages an opening (31; 32) of the first end beam (30); and the engaging element (120) of the first mounting device (100) is fixed to the plug (110) of the first mounting device (100) at a predetermined engaging-position, and wherein:
the plug (110) of the second mounting device (100) is plugged into the second end of the side beam (20) and is fixable by the key (130) of the second mounting device (100) in at least first and second predetermined plug-positions, the plug (110) of the second mounting device (100) being plugged only partially into the second end of the side beam (20) when the plug (110) of the second mounting device (100) is in the first plug-position, and the plug (110) of the second mounting device (100) being plugged fully into the second end of the side beam (20) when the plug (110) of the second mounting device (100) is in the second plug-position;

the engaging element (120) of the second mounting device (100) engages an opening (31; 32) of the second end beam (40); and the engaging element (120) of the second mounting device (100) is fixed to the plug (110) of the second mounting device (100) at a predetermined engaging-position.

9. A method for connecting two substantially horizontally aligned support beams (20; 30; 40) of a carton flow bed rack (1; 2), comprising the steps of:

plugging a plug (110) of a mounting device (100) into an end of a first support beam (20) of the rack;

fixing the plug (110) in the first support beam (20) in a first of at least two different plug-positions by means of a key (130), at least a portion of the key having a wedge shape, and with the plug (110) being plugged only partially into the first support beam when the plug (110) is in the first plug-position;

arranging an engaging element (120) at the plug (110)

fixing a second support beam (30; 40) of the two support beams to the first support beam (20) by engaging the engaging element (120) with an opening (31; 41) of the second support beam (30; 40); and fixing the plug (110) in the first support beam (20) in a second of the at least two different plug-positions by means of the key (130), the plug (110) being plugged fully into the first support beam when the plug (110) is in the second plug-position, wherein an unload tray and/or a wheel track of the rack (1; 2) are arranged while the plug (110) is arranged in the first plug-position and, after the arrangement of the unload tray and/or the wheel track of the rack (1; 2), the plug (110) is fixed to the end of the first support beam (20) in a second of the at least two different plug-positions by means of the key (130).

10. A mounting device (100) for connecting two substantially horizontally aligned support beams (20, 30, 40) of a carton flow bed rack (1; 2), comprising:
- a plug (110) pluggable into an end of a first support beam (20) of the two support beams;
- a key (130), provided as a wedge, for fixing the plug (110) in the first support beam (20); and
- an engaging element (120) arranged at the plug (110), wherein the engaging element (120) is provided to engage a second support beam (30; 40) of the two support beams; wherein:

the plug (110) is fixable to the first support beam (20) in at least two different plug-positions by means of the key (130), in a mounting position, the engaging element (120) is arranged at a face of the plug (110) facing away from the first support beam (20), and the engaging element (120) is provided as a separate element of the mounting device (100) that is fixable to the plug (110) in at least two different engaging-positions.

11. The mounting device (100) of claim 10, wherein the plug (110) comprises pin openings (116L, 116M, 116U, 117L, 117U) for fixing the engaging element (120) relative to the plug (110) in two predetermined heights corresponding to the at least two different engaging-positions.

* * * * *